(12) United States Patent
Wostmann et al.

(10) Patent No.: US 9,155,984 B2
(45) Date of Patent: Oct. 13, 2015

(54) SCREEN CARRIER ELEMENT FOR A FILTRATION DEVICE HAVING AT LEAST ONE SCREEN CAVITY

(75) Inventors: Stefan Wostmann, Sassenberg (DE); Thomas Grimm-Bosbach, Kassel (DE)

(73) Assignees: Nordson Holdings S.A.R.L. & Co., KG (DE); Seebach GMBH (DE)

( * ) Notice: Subject to any disclaimer, the term of this patent is extended or adjusted under 35 U.S.C. 154(b) by 473 days.

(21) Appl. No.: 13/522,169

(22) PCT Filed: Jan. 14, 2011

(86) PCT No.: PCT/EP2011/050492
§ 371 (c)(1),
(2), (4) Date: Dec. 14, 2012

(87) PCT Pub. No.: WO2011/086173
PCT Pub. Date: Jul. 21, 2011

(65) Prior Publication Data
US 2013/0112609 A1 May 9, 2013

(30) Foreign Application Priority Data
Jan. 14, 2010 (DE) .......................... 10 2010 000 925

(51) Int. Cl.
*B01D 29/41* (2006.01)
*B29C 47/00* (2006.01)
*B29C 47/68* (2006.01)

(52) U.S. Cl.
CPC .............. *B01D 29/41* (2013.01); *B29C 47/687* (2013.01); *B29C 47/0009* (2013.01); *B29C 47/686* (2013.01)

(58) Field of Classification Search
None
See application file for complete search history.

(56) References Cited

U.S. PATENT DOCUMENTS 3,581,902 A * 6/1971 Bidler ........................... 210/347
5,449,458 A * 9/1995 Gneuss .......................... 210/330
(Continued)

FOREIGN PATENT DOCUMENTS

DE 4212928 A1 10/1993
DE 4240461 C1 12/1993
(Continued)

OTHER PUBLICATIONS

International Preliminary Report on Patentability dated Aug. 7, 2012.
(Continued)

*Primary Examiner* — Benjamin Kurtz
(74) *Attorney, Agent, or Firm* — Fredrikson & Byron, P.A.

(57) ABSTRACT

The invention relates to a screen carrier element (100) for a filtration device comprising at least one screen cavity (101) for arranging at least one filter unit (10) therein, a support tube (15) having cut-outs (15.4) and a plurality of disk filter elements (11), each having a central hub (11.3) with which they are mounted on the support tube (15). A semi-permeable filter medium (11.1) surrounds the hub and is spread out to form a three-dimensional structure. At least one flow channel (11.4) extends in the hub element (11.5) from the main body enveloped by the filter medium (11.1) to the support tube (15), wherein the support tube (15) leads into an outlet channel (102) of the screen carrier element (100). The support tube (15) comprises a bearing section (15.1, 15.2) protruding from beneath the disk filter elements, and said bearing section can be inserted into the outlet channel (102) from the screen cavity (101). The outlet channel (102) is designed as a tapered bore over at least a part of the length thereof, which opens toward the screen cavity (101). At the same time, the bearing section of the support tube (15) has at least one tapered section (15.2) which engages with the tapered bore.

18 Claims, 4 Drawing Sheets

(56) References Cited

U.S. PATENT DOCUMENTS

Figure 1A:
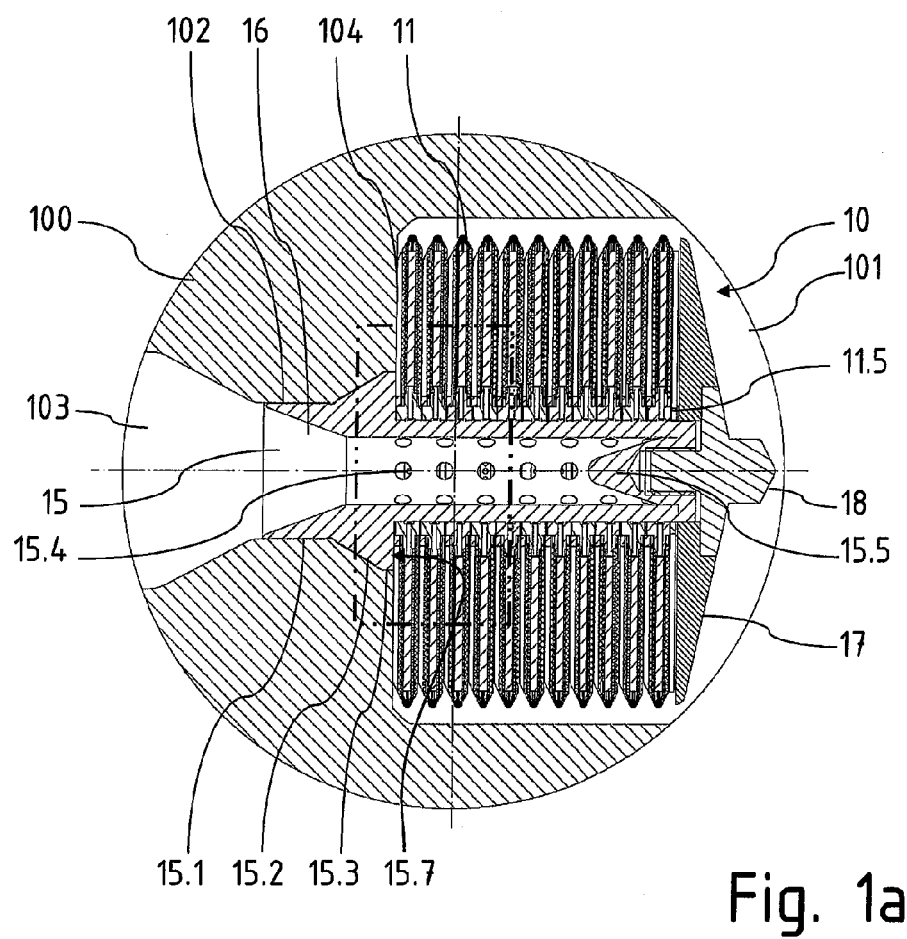

| | | | |
|---|---|---|---|
| 5,498,334 A | | 3/1996 | Gneuss |
| 5,601,854 A | * | 2/1997 | Schroeder et al. ......... 425/192 S |
| 5,833,848 A | * | 11/1998 | Tominari et al. ............. 210/232 |
| 5,916,443 A | * | 6/1999 | Mueller et al. ................ 210/346 |
| 6,471,877 B1 | * | 10/2002 | Murakami et al. ........... 210/767 |

FOREIGN PATENT DOCUMENTS

| | | |
|---|---|---|
| DE | 29520418 U1 | 3/1996 |
| DE | 102007006811 A1 | 3/2008 |
| EP | 0163742 A1 | 12/1985 |
| EP | 0728510 A2 | 8/1995 |
| JP | S62114609 U | 7/1987 |
| JP | H068306 A | 1/1994 |
| JP | H08224734 A | 9/1996 |
| JP | H1134144 A | 2/1999 |
| JP | 2002307529 A | 10/2002 |
| WO | 9501823 A1 | 1/1995 |

OTHER PUBLICATIONS

English translation of the International Search Report and Written Opinion for International Patent Application No. PCT/EP2011/050492, mailed Sep. 20, 2011, 14 pages.

English translation of the International Preliminary Report on Patentability for International Patent Application No. PCT/EP2011/050492, mailed Aug. 7, 2012, 13 pages.

* cited by examiner

SCREEN CARRIER ELEMENT FOR A FILTRATION DEVICE HAVING AT LEAST ONE SCREEN CAVITY

The invention relates to a screen carrier element for a filtration device, comprising at least one screen cavity, wherein at least one filter unit is to be fitted, and which includes a support tube having cut-outs and a plurality of disk filter elements; whereby the disk filter elements each have a central hub, with which they are mounted on the support tube; and, a semi-permeable filter medium that surrounds the hub and which is spread out to form a three-dimensional structure; whereby, there is at least one flow channel in the hub element that extends from the main body enveloped by the filter medium to the support tube; and whereby the support tube feeds into an outlet channel.

Such a screen carrier element is described in DE 10 2007 006 811 A1. The disk filter elements which are mounted on top of one another lead to a greatly increased filter area, without it being necessary to increase the size of the screen cavity wherein the filter unit is fitted.

In the case of known screen carrier elements, the support tube is screwed into an intermediate plate and is contemporaneously used to press the inter-layered disk carrier elements against the intermediate plate. The intermediate plate is inserted in a cut-out at the base of the screen cavity. There are a number of disadvantages that result:

The thick intermediate plate occupies an overall height in the screen carrier element which corresponds to approximately 3-4 disk filter elements that are layered one on top of another. As a consequence, the number of disk filter elements is lesser that it might be for the given volume of the screen cavity.

The support tube that is screwed into the intermediate plate is subjected to bending stresses upon inflow of melt which follows from outside of the center of the screen cavity and in a non-orthogonal manner. In the event this brings about deformations of the support tube, it is possible that the unscrewing that is required for the exchange of the damaged filter element may be rendered difficult or impeded.

In any event, the difficult-to-assemble screw attachment of the support tube assembly loses the time advantage that is brought by the exchangeable screen carrier elements in filter devices.

The intermediate plate and the base of the bearing section must feature a high degree of parallelism, inasmuch as the absence thereof would not ensure a seal.

The removal of the filter unit is rendered more difficult when the intermediate plate is canted in the cylindrical recess in the screen stud, or is blocked by plastic remains that have penetrated in the gap.

The purpose of the invention is therefore to further develop a screen carrier element, of the type mentioned above, in such a way that the exchange of the filter units in the screen carrier elements is facilitated.

This purpose is solved according to this invention, inasmuch as the support tube features a protruding bearing section below the support tube, which is insertable from the screen cavity side in the outlet channel and that the outlet channel is formed for at least a portion of its length as a taper bore, which opens outwards in the direction of the screen cavity, whereby the bearing section of the support tube features at least one taper section, which engages in the at least one taper bore.

Inasmuch as the support tube of the filter unit is mounted in the outlet channel of the screen carrier, the leverage effects of the melt flow can be intercepted, in the event in which the melts are not directed in a central and orthogonal manner on the filter.

The assembly is very easy, insofar as only the protruding bearing section of the filter unit, at the base of the disk filter element, needs to be inserted in the outlet channel.

The at least one taper section at the lower end of the support tube is thereby inserted in the outlet channel, which at least partially consists of a taper bore. The support tube is thereby axially fixed in place and at the same time a seal is created along the whole of the taper sections, against the screen carrier element. As soon as the pressure of the melt is applied on the filter, the same will be pressed against the taper section of the support tube in the taper shaped area of the outlet channel, this without there being a need for prior application of a pre-load.

The arrangement of the taper section on the support tube can take on different forms:

The bearing section of the support tube can feature a cylindrical end with a thereto contiguous taper section.

The bearing section of the support tube can feature a cylindrical end leading into a contiguous taper section and then leading to yet another thereto contiguous cylindrical section.

Lastly, the bearing section of the support tube can be arranged as an entirely tapered section.

It is however essential that there be a taper section, which ensures the seal and the axial fixation.

Given the plug fitting that is foreseen by the invention, there is also the further advantage that the support tube is not put under torsion stress. Whereas according to the state of the art, the whole filter unit gets screwed into the screen carrier element, which results in the support tube needing to transmit the tightening torque, in the case of the screen carrier element according to the invention, such a heavy strain on the support tube is omitted. Deformations of the support tube and the consequential leaks of the fitted filter unit are avoided.

The removal of the screen carrier element according to the invention is noticeably facilitated, inasmuch as the whole filter unit can be pushed out from the outlet side of the screen carrier element, insofar as one pushes on the rearward side of the free-laying section of the support tube.

In the event in which the filter unit were ever to become stuck, it is possible to use an impact tool, on the outlet side of the screen carrier elements, that works against the end face of the support tube or that is inserted in the central bore of the support tube and then works against a taper section from the inside.

Furthermore, when compared to the state of the art, it is possible to save on space in the case of the screen carrier elements according to the invention, so it is possible to integrate more disk filter elements in the filter unit and increase the actual filtration surface.

Further advantageous embodiments relate to the package of disk filter elements in the filter unit.

Preferably, at least one ring-shaped sealing surface is respectively created on at least one of the ends of the hubs of the disk filter element, which protrudes laterally in an axial direction beyond the filter medium that is joined to the remaining part of the hub. The ring-shaped sealing surfaces of the disk filter elements that are layered on top of each other thereby lie in front of one another. The sealing surfaces can for example be ground in such a way that there exists a high degree of parallelism of the planes of the sealing surfaces that lay on top of one another.

So as to increase the distances between the disk filter elements, it can be foreseen that metallic sealing rings, which can, for example, be made of metal fiber fleece, are inserted between the ring-shapes sealing surfaces.

Preferentially, the hubs get pressed together with the disk filter elements by means of a fixation element that can be fitted to the end of the support tube that protrudes into the screen cavity.

It is thereby ensured that that no melt can penetrate in the gap between the two adjacent sealing surfaces.

It is possible to foresee a baffle plate for optimization of the flow in the filter unit; the baffle plate is fitted in front of the disk filter element that is at the top of the filter unit in the screen cavity. It directs the melt in a homogeneous manner in the annular gap that extends around the disk filter element, and which ensures a balanced pressure distribution in the screen cavity.

By means of the fixation element, it is possible that the baffle plate can be pressed onto the disk filter elements that are layered upon one another. The baffle plate is thereby the uppermost element in the pile with the disk filter elements.

The screen carrier element is preferably laid out as a round screen carrier stud, which is part of a filtration device that is used for the filtration of fluids, in particular for the filtration of polymer melts. At least one screen carrier bore is made in a housing, in which the screen carrier stud is mounted in a movable manner.

The screen carrier element can also be a rectangular-shaped plate.

A plurality of screen cavities can be foreseen, which when looked at in the flow direction are located next to one another or across from one another. In the case of the arrangement with the cavities being located across from one another, there are two mirror-imaged screen cavities one across from the other in the screen carrier element. The outflow of the medium that is to be filtered then takes place through the middle from between the screen carrier cavities outwards, upwards or downwards.

The fixation element in particular features a threaded male section that can be screwed into a tapped bore in the support tube. The tapped bore can be located within a displacement cone. The same is arranged in the area within the support tube and indicates the outlet side with the pointed end. The displacement cone impedes the creation of a dead-water zone in the end area of the support tube and thereby prevents that the melt or other filtered materials become stored and decompose in this area.

The shape of the support tubes can be round. In this case, flow paths must then be created from the outlets of the flow channels on the inner circumference of the hubs to the cut-outs in the jacket of the support tube. This can be achieved through paths implemented on the outer jacket or through grooves that have been applied to the outer circumference.

In a preferred embodiment, it is foreseen that the support tube features a polygonal cross-section. In which case, the bore in the hub should be cylindrical. Vice versa, the cut-out in the hub could also be polygonal and the jacket of the tube could be cylindrical. Inasmuch as the forms of the shape of the support tube and the inner shape of the hub do not correspond with one another, a plurality of axial running flow channels are created, which facilitates the outflow of the medium to the inside of the support tube.

Figure 1B:
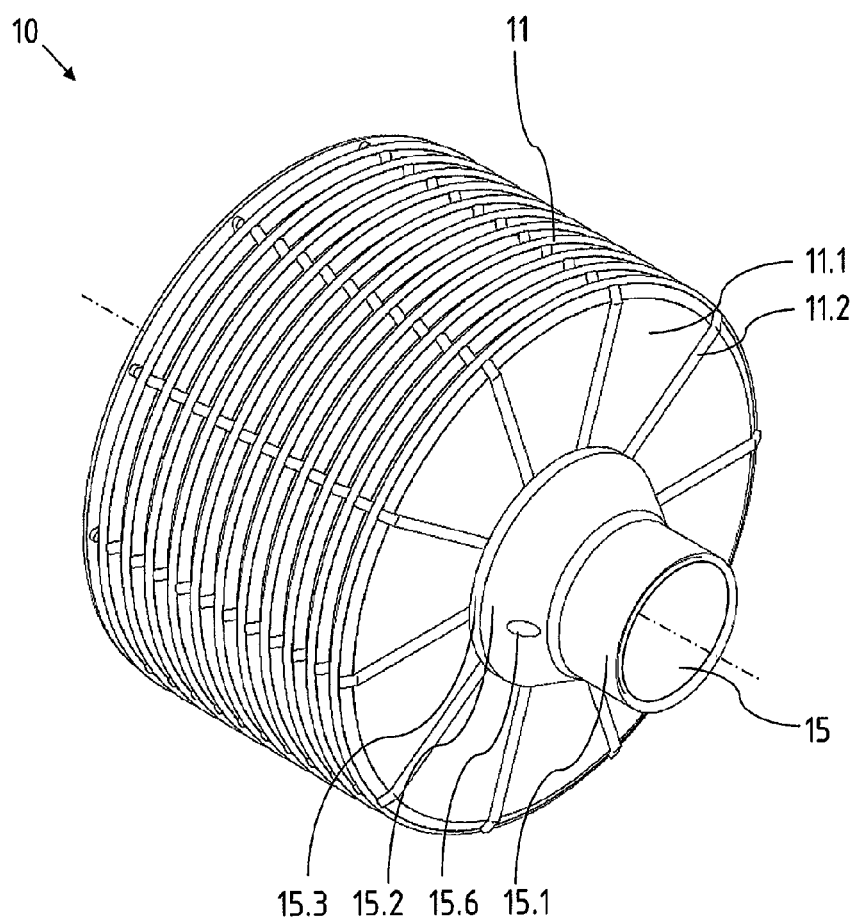
Figure 2:
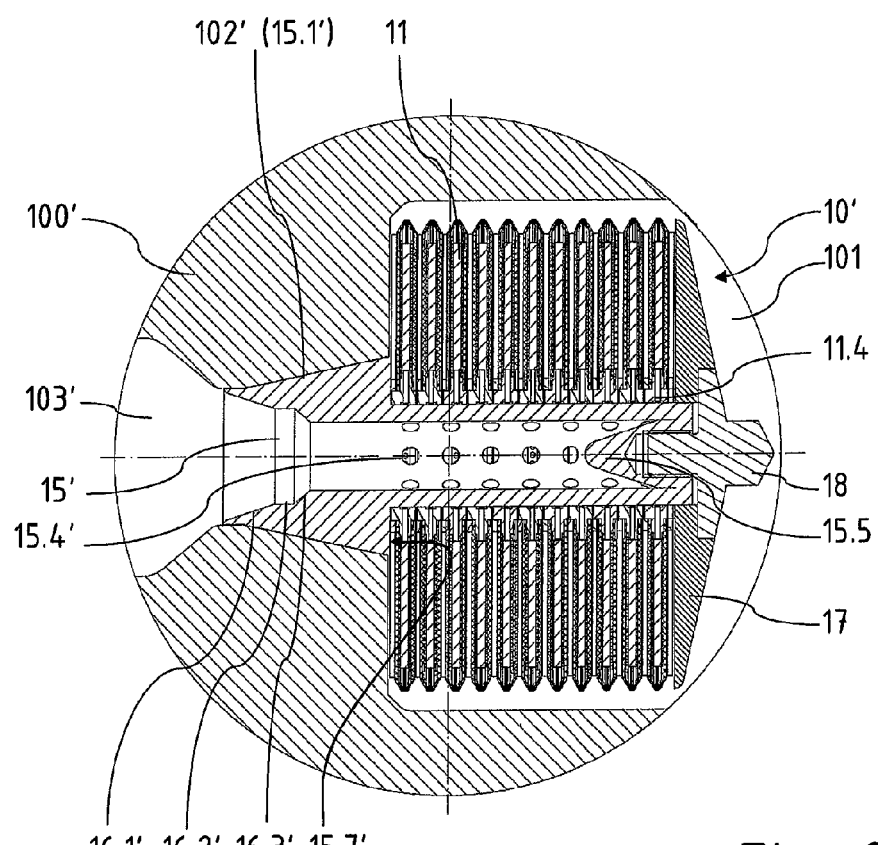
Figure 3:
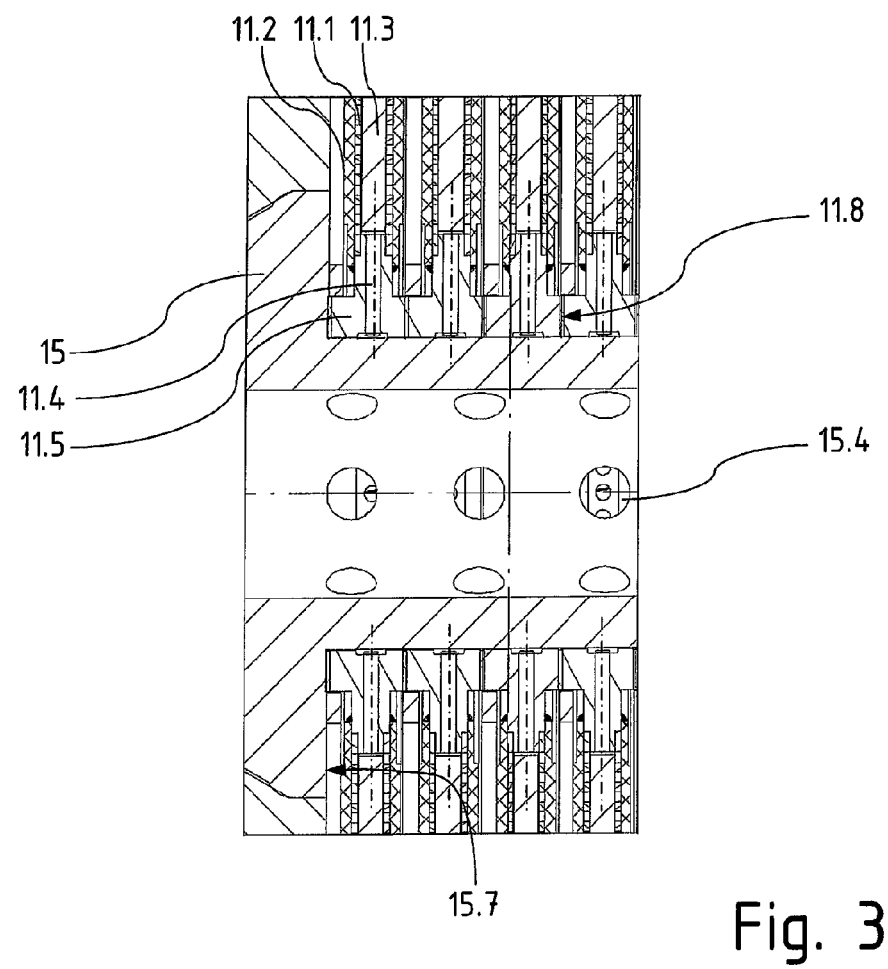

The invention will be described in more detail hereafter, with reference being made to the drawing. The figures more specifically show:

FIG. 1a A screen carrier element, in profile, according to a first embodiment;

FIG. 1b The filter unit of the screen carrier element from FIG. 1a, in perspective view;

FIG. 2 A screen carrier element, in profile, according to a second embodiment; and FIG. 3 A detail from FIG. 1a in enlarged representation.

FIG. 1a shows a screen carrier element 100 in a profile representation, which features a screen cavity 101.

An outlet channel 102 extends between the screen cavity 101 and an outlet opening 103 on the outer circumference of the screen carrier element 100. As seen from the side of the screen cavity 101, the outlet channel 102 initially has a short cylindrical shape, then a taper section and lastly another cylindrical section, all before it widens in a funnel shape to the outlet opening 103.

The inner shape of the outlet channel 102 that is thus described corresponds to the outer shape of the end of a support tube 15 of a filter unit 10 that is described here as a bearing section.

The bearing section therefore encompasses two cylindrical sections 15.1, 15.3 as well as a taper-shaped section 15.2 that lies between the first two.

The hollow support tube 15 internally widens at its end to a taper-shaped bore 16, whereby the angle of the taper of the bore 16 preferentially corresponds to the taper angle of the outlet opening 103, in such a way that there is a seamless transition there.

The largest portion of the filter unit 10 is fitted in the screen cavity 101. A plurality of ring-formed disk filter elements 11 are pushed onto the support tube 15 along with their respective central hub 11.5. The package of filter elements 11 is axially affixed onto a terrace 15.7 on the support tube 15. A baffle plate 17 is fitted on the other side of the package of disk filter elements 11; this plate covers the topmost disk filter element 11 of the pile. A fixation element 18 is screwed into the support tube 15 and thereby presses the baffle plate against the metallic hubs 11.5 of the disk filter elements 11 and the whole pile against the terrace 15.7.

The support tube 15 contains a plurality of cut-outs 15.4 in its jacket which allow the transition of the melt from the inside of the respective disk filter elements 11 into the central bore of the support tube 15.

A displacement cone 15.5 in the support tube 15 improves the flow properties of the filtered medium in the end range.

FIG. 1b shows a filter unit 10 that has been removed from the screen carrier element 100 in a perspective view, with a prospect on the bearing section of the support tubes 15. The cylindrical sections 15.1 and 15.3, as well as the taper-shaped section 15.2 that lies between the first two are clearly visible.

A drilling 15.6 is recognizable in the taper-shaped section 15.2. A further drilling is located in a diametrically opposed position of the taper-shaped section 15.2. The drillings 15.6 serve as installation aids. A suitable keyed tool can be applied to the drillings so as to counter the torque which is created upon tightening or loosening of the fixation element. The fixation element presses the disk filter element on the other end of the support tube. Therefore, the filter unit should not be held with pliers against its location terrace or even be clamped in a vice, as this could lead to damage of the taper-shaped sealing surface.

Furthermore, the in itself known assembly of the disk filter elements 11 on the filter unit 10 is clearly recognizable in FIG. 1b. A spacer 11.2 is used to allow the homogeneous inflow of a thin semi-permeable filter medium. It is possible that the filter medium can be, for example, a metal thread weave or fleece. A hollow main body is enveloped by the filter medium.

The medium that is to be filtered, in particular a plastic melt, passes through the filter medium into the main body of the respective disk filter element 11 and then out through a flow channel 11.4 in the hub 11.5 and flows through the cut-outs 15.4 to the inside of the support tube 15.

FIG. 3 shows an enlargement of the portion that is highlighted in FIG. 1a with a dotted line. It concerns the area in which the first four disk filter elements 11 are pressed up against the terrace 15.7 of the support tube 15.

The assembly of the disk filter elements 11 is recognizable in the enlarged representation. The ring-shaped hub 11.5 has two outlying terraces with a lesser axial extension than can be found on the inward lying terrace. The outlying terraces serve the purpose of ensuring that the filter medium 11.1 and/or the spacer 11.2 protrudes in an axial direction over top of the sealing surface 11.8 on the hub 11.5 and that a homogeneous distance is available between the individual filter elements, which is pre-determined through the terrace height and the thickness of the spacer.

FIG. 2 shows a further embodiment of a screen carrier element 100' with a filter unit 10'. What makes this different from the previously described embodiment of a screen carrier element 100 is solely that an outer channel 102' is laid out as a continuous taper bore and that accordingly on the bearing section of the support tube 15' there is likewise only a continuous taper section 15.1'.

The support tube 15' features two taper sections 16.1' and 16.3' on its outlet-side end and cylindrical section 16.2' that lies between the former two sections. The remaining section of the filter unit 10' with the disk filter elements 11 is built up in the same manner as described for the first embodiment.

The invention claimed is:

1. A screen carrier element for a fluid filtration device, said screen carrier element comprising:
    a screen cavity;
    an outlet channel having a filter unit bearing surface including a cylindrical bore section and a tapered bore section, said tapered bore section opens outwardly toward said screen cavity; and
    a filter unit disposed in said screen cavity, said filter unit comprising:
        a plurality of disk filter elements, each of said disk filter elements having a semi-permeable filter medium;
        a plurality of central hubs, each central hub having an outer surface, an inner surface, and a flow channel extending from said outer surface to said inner surface, each of said disk filter elements mounted to a respective one of said central hubs proximate said outer surface thereof; and
        a support tube having a plurality of cutouts, each of said central hubs mounted to said support tube proximate said inner surface of such central hub, said support tube including a protruding bearing section that is proximate said outlet channel and comprises a cylindrical bearing section and a tapered bearing section, said protruding bearing section configured to be inserted from said screen cavity into said outlet channel such that said cylindrical bearing section of said support tube engages said cylindrical bore section of said outlet channel, and said tapered bearing section of said support tube engages with said tapered bore section of said outlet channel.

2. A screen carrier element according to claim 1, wherein faces of said central hubs of said disk filter elements form ring-shaped sealing surfaces, that protrude in an axial direction beyond a portion of said respective filter medium that is mounted to said respective central hub, and said disk filter elements are arranged along said support tube adjacent one another such that said ring-shaped sealing surfaces contact said adjacent ring-shaped sealing surfaces.

3. A screen carrier element according to claim 2, wherein metallic sealing rings are fitted between said ring-shaped sealing surfaces.

4. A screen carrier element according to claim 2, wherein metal fiber fleece sealing rings are fitted between said ring-shaped sealing surfaces.

5. A screen carrier element according to claim 1, wherein said central hubs of said disk filter elements are compressed together by means of a fixation element that is secured to said support tube.

6. A screen carrier element according to claim 1, comprising a baffle plate located adjacent one of said plurality of filter elements that is most distal from said outlet channel.

7. A screen carrier element according to claim 6, wherein said fixation element applies a force to said baffle plate, wherein said force causes said baffle plate to press against said disk filter elements arranged adjacent one another along said support tube.

8. A screen carrier element according to claim 7, wherein said fixation element comprises a threaded section that can be screwed into a tapped hole in said support tube.

9. A screen carrier element according to claim 1, wherein a displacement cone is located in said support tube.

10. A screen carrier element according to claim 9, wherein a tapped hole is located in said displacement cone.

11. A screen carrier element according to claim 1, wherein said support tube comprises a round cross-section.

12. A screen carrier element according to claim 1, wherein said support tube comprises a polygonal cross-section.

13. A screen carrier element according to claim 1, wherein the screen carrier element comprises a plurality of said screen cavity arranged side-by-side when viewed in the direction of the fluid flow.

14. A screen carrier element according to claim 1, wherein the screen carrier element comprises a plurality of said screen cavity arranged in a mirror-image manner in said screen carrier element.

15. A screen carrier element according to claim 1, wherein said screen carrier element is set out as a round screen carrier stud.

16. A screen carrier element according to claim 1, wherein said screen carrier element is a right-angled shaped plate.

17. A filtration device for the filtration of polymer melts, the filtration device comprising: a housing having a screen carrier drilling; and said screen carrier element according to claim 1 inserted into said screen carrier drilling.

18. A screen carrier element according to claim 1, wherein said filter unit bearing surface of said outlet channel comprises a second cylindrical bore section located between said tapered bore section and said screen cavity, and said protruding bearing section of said support tube comprises a second cylindrical bearing section located between said tapered bearing section and said plurality of disk filter elements such that said second cylindrical bearing section engages said second cylindrical bore section.

* * * * *